(12) United States Patent
Petridis et al.

(10) Patent No.: US 10,174,839 B2
(45) Date of Patent: Jan. 8, 2019

(54) METHOD FOR REDUCING THE AMOUNT OF FUEL USED BY AN ENGINE OF A MOTOR VEHICLE

(71) Applicant: Ford Global Technologies, LLC, Dearborn, MI (US)

(72) Inventors: Anthemios Philemon Petridis, Bishop's Stortford (GB); Nicholas Dashwood Crisp, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 15/045,866

(22) Filed: Feb. 17, 2016

(65) Prior Publication Data

US 2016/0245405 A1 Aug. 25, 2016

(30) Foreign Application Priority Data

Feb. 20, 2015 (GB) .................................. 1502882.2

(51) Int. Cl.
*F16H 63/42* (2006.01)
*B60K 31/00* (2006.01)
(Continued)

(52) U.S. Cl.
CPC ............. *F16H 63/42* (2013.01); *B60K 31/00* (2013.01); *B60K 35/00* (2013.01);
(Continued)

(58) Field of Classification Search
CPC ........................... B60K 41/04; B60W 2540/00
See application file for complete search history.

(56) References Cited

U.S. PATENT DOCUMENTS 4,463,427 A * 7/1984 Bonnetain ............... F16H 63/42
477/34
5,564,999 A 10/1996 Bellinger et al.
(Continued)

FOREIGN PATENT DOCUMENTS

CA 2856546 A1 6/2013
DE 4028833 C2 * 4/1994 ......... F16H 61/0213
(Continued)

OTHER PUBLICATIONS

Machine translation JP2012207772A filed Sep. 11, 2018 (Year: 2018).*

(Continued)

*Primary Examiner* — Tisha D Lewis
(74) *Attorney, Agent, or Firm* — Julia Voutyras; McCoy Russell LLP (57) ABSTRACT

A method for reducing the fuel used by an engine of a motor vehicle. The method limits the speed at which the engine can rotate when a predefined engine upper speed limit $N_{ECOUL}$ for the particular gear in which the motor vehicle is currently operating has been reached or limiting the road speed of the motor vehicle when a predefined vehicle road speed has been reached. The use of engine or road speed limiting combined with the alerting of the driver via an indicator that an upshift is desired to improve fuel economy encourages the driver to execute an upshift.

23 Claims, 3 Drawing Sheets

(51) Int. Cl.
*B60K 35/00* (2006.01)
*B60R 16/023* (2006.01)

(52) U.S. Cl.
CPC ... *B60K 2350/1092* (2013.01); *B60R 16/0236* (2013.01); *Y02T 10/84* (2013.01)

(56) References Cited

U.S. PATENT DOCUMENTS

| | | | |
|---|---|---|---|
| 5,879,267 | A | 3/1999 | Desautels et al. |
| 8,868,312 | B2 | 10/2014 | Pedlar et al. |
| 9,630,610 | B2 * | 4/2017 | Takeuchi ............... B60W 10/04 |
| 2005/0102082 | A1 * | 5/2005 | Joe ......................... B60K 6/365 701/54 |
| 2006/0293824 | A1 | 12/2006 | Steen et al. |
| 2011/0202243 | A1 | 8/2011 | Ishibashi et al. |
| 2014/0257653 | A1 | 9/2014 | Sato et al. |
| 2014/0309910 | A1 | 10/2014 | Hesketh et al. |

FOREIGN PATENT DOCUMENTS

| | | |
|---|---|---|
| EP | 0241801 A2 | 3/1987 |
| EP | 1443193 A1 | 8/2004 |
| EP | 1928685 B1 | 6/2012 |
| GB | 2516690 A | 2/2015 |
| GB | 2516703 A | 2/2015 |
| JP | 2011501041 A | 1/2011 |
| JP | 2012207772 A * | 10/2012 |

OTHER PUBLICATIONS

Petridis, Themi Philemon et al., System and Method for Controlling Hybrid Vehicle, U.S. Appl. No. 15/049,533, filed Feb. 22, 2016, 28 pages.

\* cited by examiner

METHOD FOR REDUCING THE AMOUNT OF FUEL USED BY AN ENGINE OF A MOTOR VEHICLE

CROSS REFERENCE TO RELATED APPLICATION

The present application claims priority to Great Britain Patent Application No. 1502882.2, entitled "A Method for Reducing the Amount of Fuel Used by an Engine of a Motor Vehicle," filed Feb. 20, 2015, the entire contents of which are hereby incorporated by reference for all purposes.

FIELD

The present disclosure relates to a method for reducing the fuel used by an engine of a motor vehicle and in particular to a method for encouraging a driver to change into a higher gear when it is advantageous to do so in order to improve fuel economy.

BACKGROUND AND SUMMARY

It is known to provide a driver selectable Economy Mode (Eco-Mode) to enable a driver to bias the performance/fuel economy relationship in favor of fuel economy. One known Eco-Mode feature is to limit the maximum speed that a vehicle can travel at but such a feature does not have any positive impact on fuel economy during an acceleration phase of the motor vehicle. In order to address the need for reducing fuel consumption during the acceleration phase it is also known to provide an indication to a driver of the desired (e.g., optimum) gear-based engine speed for an up-shift via a Shift Indication Light (SIL) sometimes referred to as a gear shift indicator (GSI).

It is a problem with such GSI devices that it is left up to driver of the motor vehicle to decide whether to follow the recommended shift schedule as provided by the GSI or not. If the driver regularly ignores the GSI then there will be very little reduction in fuel usage and so there is a risk that customers will be dissatisfied with the fuel economy benefit obtained when using an Eco-mode of operation. Therefore finding the right balance between performance degradation and improved fuel economy is essential if a driver is to realize the benefit of selecting an ECO-mode of operation.

To overcome at least some of the aforementioned problems, a method for reducing the amount of fuel used by an engine of a motor vehicle having a transmission providing a number of forward ratios selectable by the driver of the motor vehicle is provided. The method includes, when one of the speed of the engine and the road speed of the vehicle reaches a predefined upper speed limit for the currently selected gear, controlling one of the speed of the engine and the road speed of the vehicle to maintain the speed at a speed substantially equal to the predefined upper speed limit for the currently selected gear and providing an indication to a driver of the motor vehicle that the selection of a higher gear ratio is required in order to increase fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A method that limits the speed of an engine and indicates to the driver that shifting the vehicle's transmission into a higher gear will improve fuel economy is described herein. Limiting engine speed and providing the driver with cues that shifting the transmission into a higher gear provide multiple cues to the driver to alert them that corrective actions are needed to improved fuel economy. In this way, a driver can be prompted by different cues to increase vehicle efficiency through driver initiated actions. Consequently, the likelihood of the driver shifting to a higher gear to improve fuel economy is increased.

In one example, a method for reducing the amount of fuel used by an engine of a motor vehicle having a transmission providing a number of forward ratios selectable by the driver of the motor vehicle is provided. The method includes when one of the speed of the engine and the road speed of the vehicle reaches a predefined upper speed limit for the currently selected gear, controlling one of the speed of the engine and the road speed of the vehicle to maintain the speed at a speed substantially equal to the predefined upper speed limit for the currently selected gear and providing an indication to a driver of the motor vehicle that the selection of a higher gear ratio will increase fuel economy.

In one example, the speed is the speed of the engine, the upper speed limit is an upper engine speed limit and the method comprises, when the speed of the engine reaches a predefined upper engine speed limit for the currently selected gear, controlling the speed of the engine to maintain the speed of the engine at a speed substantially equal to the predefined engine upper speed limit for the currently selected gear and providing an indication to a driver of the motor vehicle that the selection of a higher gear ratio is required in order to increase (e.g., optimize) fuel economy.

The method may further include permitting the speed of the engine to exceed the predefined engine upper speed limit if an accelerator pedal of the motor vehicle has been depressed from a rest position more than a predefined amount.

The position of the accelerator pedal may be compared with a predefined accelerator pedal position limit to determine whether it has been depressed more than the predefined amount.

The method may further include limiting the engine speed to the predefined engine upper speed limit if the motor vehicle is operating in an economy mode (ECO-mode) of operation.

The method may further include only providing an indication to a driver of the motor vehicle that the selection of a higher gear ratio is required in order to increase (e.g., optimize) fuel economy if the motor vehicle is operating in an ECO-mode of operation.

The ECO-mode of operation may be selectable by the driver of the motor vehicle by the use of a human machine interface. The human machine interface may be one of a manually operable switch, a pseudo switch provided via a touch screen device, a cluster menu system and a voice activated switch.

Alternatively, the speed is the road speed of the motor vehicle, the upper speed limit is an upper road speed limit and the method includes, when the road speed of the motor vehicle reaches a predefined upper road speed limit for the currently selected gear, controlling the road speed of the vehicle to maintain the road speed of the vehicle at a speed substantially equal to the predefined upper road speed limit for the currently selected gear and providing an indication to a driver of the motor vehicle that the selection of a higher gear ratio is required in order to increase (e.g., optimize) fuel economy.

Providing an indication to a driver of the motor vehicle that the selection of a higher gear ratio is needed in order to increase (e.g., optimize) fuel economy may comprise at least one of providing an audible indication that an upshift is required and providing a visual indication that an upshift is needed.

A motor vehicle having an engine drivingly connected to a transmission having a number of forward ratios selectable by the driver of the motor vehicle is also described herein. The motor vehicle also includes a control system to control the operation of the engine wherein the control system is operable, when the rotational speed of the engine reaches a predefined upper engine speed limit for the currently selected gear, to control the speed of the engine to maintain the speed of the engine to a value substantially equal to the predefined engine upper speed limit for the currently selected gear and provide an indication to a driver of the motor vehicle that the selection of a higher gear ratio is needed in order to increase (e.g., optimize) fuel economy.

The motor vehicle may further include an accelerator pedal to provide an input of driver demand and the control system is further operable to permit the speed of the engine to exceed the predefined engine upper speed limit if the accelerator pedal has been depressed from a rest position more than a predefined amount.

The control system may be operable to compare the position of the accelerator pedal with a predefined accelerator pedal position limit to determine whether the accelerator pedal has been depressed more than the predefined amount.

The control system may only limit the engine speed to the predefined engine upper speed limit if the motor vehicle is operating in an ECO-mode of operation, in one example.

Additionally, the control system may only provide an indication to a driver of the motor vehicle that the selection of a higher gear ratio is required in order to increase (e.g., optimize) fuel economy if the motor vehicle is operating in an ECO-mode of operation.

The motor vehicle may further include a human machine interface and the ECO-mode of operation may be selectable by the driver of the motor vehicle by the use of the human machine interface.

The human machine interface may include a manually operable switch, a pseudo switch provided via a touch screen device, a cluster menu system and/or a voice activated switch.

Providing an indication to a driver of the motor vehicle that the selection of a higher gear ratio is required in order to increase (e.g., optimize) fuel economy may comprise at least one of providing an audible indication that an upshift is required and providing a visual indication that an upshift is desired to improve fuel economy.

The transmission may be a manual transmission having a driver operable gear lever to select a desired gear of the transmission. In another example, the engine may be drivingly connected to the transmission by a manually controlled clutch.

Figure 1:
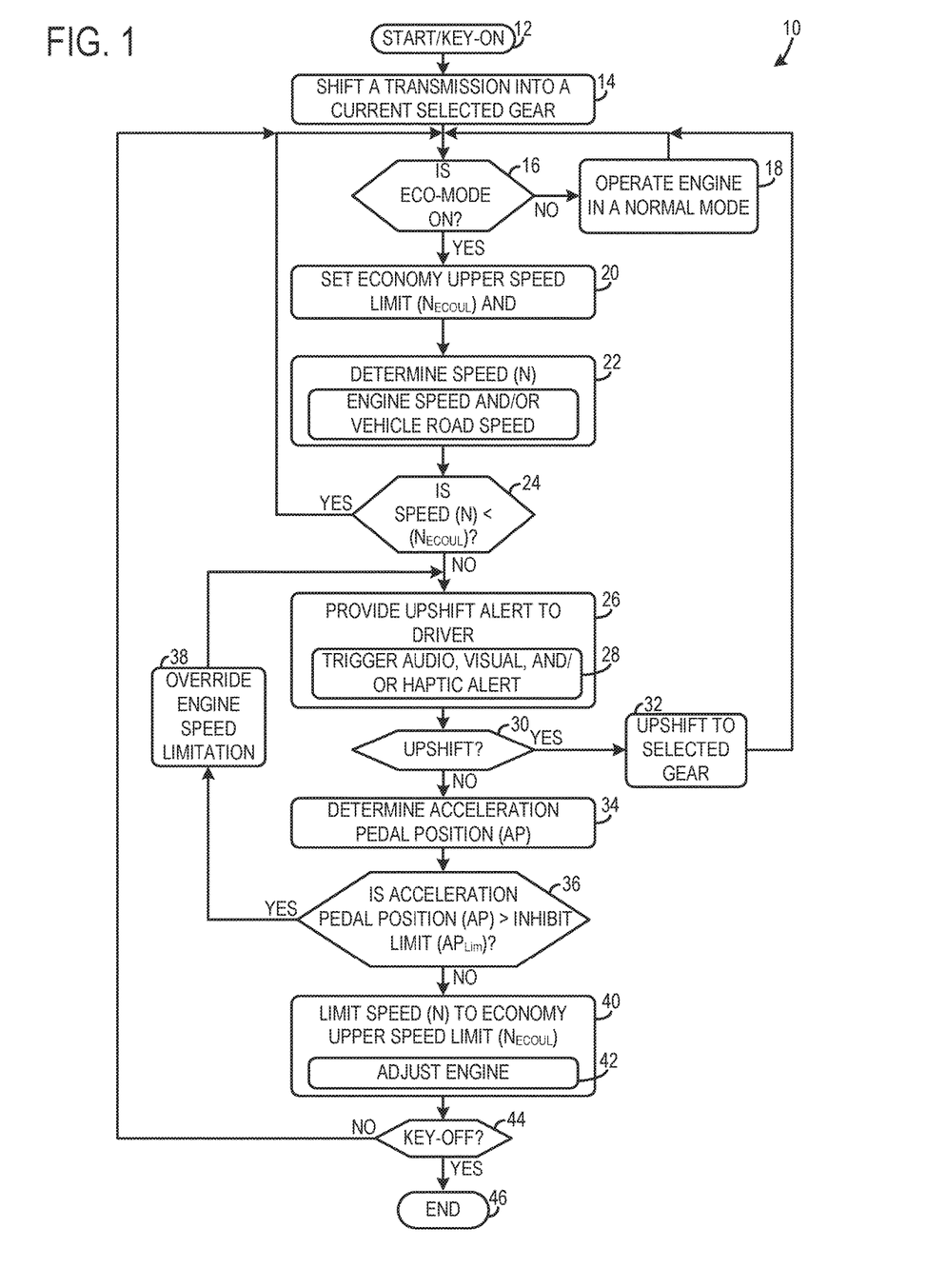
FIG. 1 is a flow chart of a method for reducing the amount of fuel used by an engine of a motor vehicle.

With reference to FIG. 1, a method 10 for reducing the amount of fuel used by an engine of a motor vehicle having a transmission providing a number of forward ratios selectable by the driver of the motor vehicle is depicted. The method 10 may be implemented by the motor vehicle described with regard to FIG. 2 or may be implemented by another suitable motor vehicle.

The method 10 starts at box 12 which corresponds to a Key-on event and then advances to box 14 where the method includes shifting the transmission into a current selected gear. It will be appreciated that shifting a transmission into a selected gear may be initiated by the driver actuating a gear selection device in the transmission such as a gearshift, button, paddle, etc.

At box 16 it is determined whether an economy mode (ECO-mode) of operation has been selected by a driver of the motor vehicle. In some embodiments, the motor vehicle may be continuously run in a single mode of operation. In such an embodiment there is no separate "ECO-mode" of operation. Therefore, in such a case box 16 would not be present and the method would advance directly from box 12 to box 20 and the method would be used whenever the vehicle is operating. However, in some vehicles the driver may be given the opportunity to select an ECO-mode of operation or use a normal mode of operation. When the ECO-mode is selected the motor vehicle is operated so as to maximize fuel economy and this ECO-mode may include, in addition to the use of a method in accordance with this invention, using automated stop-start operation of the engine, restricting the power consumption of an air conditioner for the motor vehicle or any other facility provided to reduce the amount of fuel used by the engine. In one example, the ECO-mode may be selected via human machine interface including one or more of a manually operable switch, a pseudo switch provided via a touch screen device, a cluster menu system and a voice activated switch.

If it is determined that the Eco-mode of operation has not been selected by the driver (NO at 16) the method advances to box 18 where the engine is operated in a normal mode of operation. In one example, in the normal mode of operation the vehicle may increase or in some cases suspend certain limits (e.g., engine speed limits, fuel consumption limits, etc.,) imposed in the economy mode operation.

However, if it is determined that the Eco-mode of operation has been selected by the driver (YES at 16) the method advances to box 20. At box 20 an engine upper speed limit ($N_{ECOUL}$) is set for the current gear so as to become a predefined engine upper speed limit for the engine while operating in the current gear. It will be appreciated that the engine upper speed limit ($N_{ECOUL}$) is not necessarily the same for every gear and its value will depend upon a number of factors including, but not limited to, the respective torque/speed relationship for the engine, the relationship between specific fuel consumption and engine speed for the engine and the overall gear ratio from the engine to the road wheels. However, in other examples the engine upper speed limit for two or more gears may be substantially equivalent.

After setting an engine upper speed limit ($N_{ECOUL}$) in box 20 the method advances to box 22 where a speed is determined such as the engine speed and/or the vehicle road speed.

Next at box 24 the method includes determining whether the current engine speed (N) is less than the engine upper speed limit ($N_{ECOUL}$) for the gear in which the motor vehicle is currently travelling.

If it is determined that the current engine speed (N) is less than the engine upper speed limit ($N_{ECOUL}$) for the current gear (YES at 24) the method returns to box 16 because the engine is operating within a speed range considered to be economical.

However, if it is determined that the current engine speed (N) is equal to or greater than the engine economy upper speed limit ($N_{ECOUL}$) for the current gear the test is failed (NO at 24) the method advances from box 24 to box 26 where the driver is alerted of the need to execute an upshift via a gear shift indicator (GSI) or other device(s) to improve engine fuel economy. For instance, alerting the driver of the need to execute an upshift may include triggering an audio, visual, and/or haptic alert at box 28. For instance, a buzzer, light, display, and/or steering column vibration unit may be triggered to alter the driver that an upshift is needed to increase fuel economy.

The method then advances from box 26 to box 30. At box 30 the method determines if an upshift has been requested by a driver. If an upshift has been requested by the driver (YES at box 30) the method proceeds to box 32. At box 32 the method includes upshifting to a selected gear via the vehicle transmission. In the case of a manual transmission the driver may simply implement an upshift, and therefore the step of requesting the upshift and implementing the upshift may be one and the same.

However, if an upshift has not been requested by the driver (NO at box 30) the method advances to box 34 where the method determines an acceleration pedal position (AP). For instance, the depression of the accelerator pedal from a rest position may be measured to provide a current accelerator pedal position (AP). However, in other examples the acceleration pedal position may be measured using another technique and/or another suitable acceleration actuator may be used in the vehicle. Next at box 36 the method includes comparing the current position (AP) of the accelerator pedal of the motor vehicle to a predefined accelerator pedal position limit ($AP_{Lim}$). In one example, box 36 may check whether the current position (AP) of the accelerator pedal is greater than the predefined accelerator pedal position limit ($AP_{Lim}$). For example and without limitation, if the accelerator pedal has been depressed less than 80% of its travel from a rest or released position then engine speed limiting is effective but if it has been depressed more than 80% then no engine speed limiting is used. It will be appreciated that the value of accelerator pedal position could be an analogue value such as a voltage from a potentiometer or a digital value and need not be a percentage of travel.

If the position (AP) of the accelerator pedal is greater that the predefined accelerator pedal position limit ($AP_{Lim}$) (YES at 36), the method proceeds to box 38 where the method includes overriding engine speed limitations. Overriding engine speed limitations may include permitting an increase in fuel injection above ECO-mode limits and/or a decrease in throttling below ECO-mode limits, for instance. In this way, a driver is allowed to continue accelerating past the engine speed (N) where limiting would normally be applied (the engine upper speed limit ($N_{ECOUL}$)) to provide the additional acceleration that may for example be desired to execute an overtaking maneuver, evasive maneuver, etc.

However, if the position (AP) of the accelerator pedal is not greater than the predefine acceleration pedal position limit ($AP_{Lim}$) (NO at 36) the method advances to box 40 where the method includes limiting speed (N) to economy upper speed limit ($N_{ecoul}$). Box 40 may include box 42 where the engine is adjusted to limit the vehicle and/or engine speed to the upper speed limit. For instance, an amount of fuel injection may be decreased.

At box 44 the method determines whether a Key-off event has occurred and, if it has, the method ends at box 46 but otherwise returns to box 16 and will continue to loop around boxes 16 to 46 provided the various requirements for speed limiting are still met.

It will be appreciated that, if the driver executes an upshift, the engine speed (N) will drop below the predefined engine upper speed limit ($N_{ECOUL}$) for the next higher gear and so the test in box 24 will not be failed at the first execution of that box resulting in a return to box 16.

Although not specifically shown in FIG. 1 there is normally a small difference between the engine speed at which the upshift alert is provided by the GSI and the engine speed at which speed limiting commences. This is provided so as to give the driver the opportunity to change up before feeling the effect of speed limiting. For example and without limitation, there could be a first value of $N_{ECOUL}$ ($N_{ECOUL1}$) for use in box 24 and a second higher value of $N_{ECOUL}$ ($N_{ECOUL2}$) for use in box 40. In such a case, the difference between ($N_{ECOUL2}$) and ($N_{ECOUL1}$) could be in the region of 350 RPM. However, many speed values have been contemplated.

It will further be appreciated that, whenever a Key-off event occurs, the method will end, in one example. Therefore during normal acceleration of the motor vehicle the driver will be encouraged by the effect of the engine speed limiting to change up when the GSI is lit thereby reducing fuel usage and improving fuel economy.

A driver using a motor vehicle employing this method soon learns that for smooth progress it is advisable to change up into a higher gear when advised to do so by the GSI and, as referred to above, in some embodiments the GSI may be illuminated before the limited engine speed has been reached in order to provide the driver with a pre-warning that an upshift is imminently desired.

Figure 2:
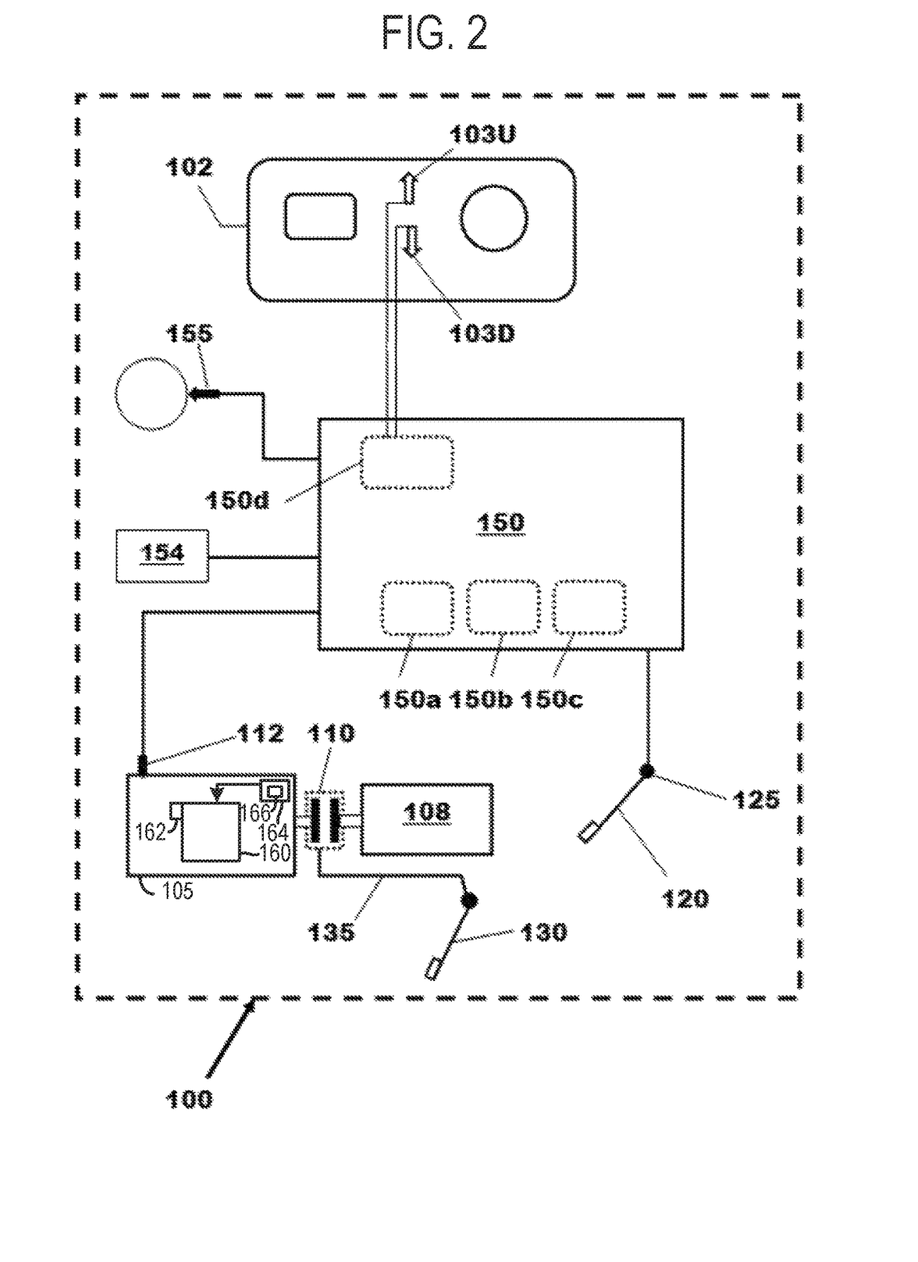
FIG. 2 is a schematic diagram of a motor vehicle operable in 'Normal' and 'ECO' modes of operation.

With reference to FIG. 2 there is shown a motor vehicle 100 having an instrument panel 102, an engine 105 driving a transmission 108 via a clutch 110 and an electronic control system 150 to control various functions of the motor vehicle 100.

The instrument panel 102 includes a 'GSI' in the form of an upshift indicator light 103U and a downshift indicator light 103D that are used to assist in reducing the fuel consumption of the motor vehicle 100.

It will be appreciated that the GSI could alternatively be a numerical indication of recommended gear or an arrow recommending an upshift (e.g., an arrow pointing up) or downshift (e.g., an arrow pointing down). The arrow could be illuminated or provided as a graphical symbol on a display. The GSI may also include an audio and/or haptic component alerting via sound and/or vibration that an upshift is desired.

The clutch 110 may be manually controlled by a clutch pedal 130 that is connected to the clutch 110 via a clutch linkage 135. It will be appreciated that the clutch linkage 135 can be of any suitable type such as, for example, a mechanical linkage, a hydraulic linkage or an electrically operated linkage (e-clutch) or a combination of any of these.

The transmission 108 is in this case a manually operated transmission having a number of gear ratios selectable by the driver of the motor vehicle 100 by means of a gear lever. However, in other examples different types of transmissions where the driver is in direct control of the selection of the various ratios by the movement of an input device such as, for example, a gear stick, a gear lever, steering wheel paddles or other input device. That is to say, the transmission could be an automatic transmission having the facility to permit driver control of the selected gear. See for example U.S. Pat. No. 5,070,740.

The electronic control system 150 includes a number of control modules 150a to 150d and, in the case of this example, the module 150a is a fuel injection control unit, the module 150b is a throttle valve control unit, the module 150c is an ignition control unit and the module 150d is a GSI control unit. It will be appreciated that the modules 150a to 150d could be formed as part of a single controller, there could be separate units as shown or various functions could be combined in one or more control units. It will also be appreciated that there could be more or less modules than the four shown.

The electronic control system 150 receives in this case a first input from an engine speed sensor 112, a second input from an ECO-mode selector switch 154, a third input from a vehicle road speed sensor 155 and a fourth input from an accelerator pedal position sensor 125 associated with an accelerator pedal 120.

It will be appreciated that various other inputs could be provided to the electronic control system such as, for example, inputs relating to the current operating state of the engine 105.

It will be appreciated that the currently selected gear could be provided by means of one or more sensors associated with the transmission 108 but in this case is inferred from the relationship between engine speed and road speed as measured by the engine speed sensor 112 and the road speed sensor 155. As yet another alternative, the currently selected gear could be provided from a transmission controller if the transmission is an automatic transmission.

The ECO-mode selector switch 154 forms a human machine interface (HMI) and can be a physical switch that can be manipulated by the driver. The switch could be used to activate other functions such as, for example, an automated stop-start system. Alternatively, the ECO-mode selector switch 154 could be a pseudo switch such as, for example, a symbol appearing on a touch screen device, a cluster menu system navigated by using buttons, a voice activated switch or any other suitable device for enabling the driver to change the operating state of the motor vehicle 100 from a 'normal mode' of operation to an 'ECO-mode' of operation.

The GSI module 150d is operable to control the illumination of the upshift indicator light 103U and the downshift indicator light 103D in order to improve (e.g., optimize) fuel economy and thereby reduce the amount of fuel used by the engine 105 and also to provide a control signal to limit the speed of the engine 105 when speed limiting is required to encourage an upshift.

The electronic control system 150 therefore via its various modules 150a to 150d is operable to execute the method as shown and described with reference to FIG. 1.

The current engine speed (N) is measured by the engine speed sensor 112 and a signal indicative of that rotational speed is provided to the electronic control system 150.

The GSI module 150d produces a value of engine speed for the gear in which the vehicle 100 is currently operating that is used as a test value ($N_{ECOUL}$) against which the current engine speed (N) is tested. The GSI module 150d may store test values ($N_{ECOUL}$) for the various gears of the transmission 108 or may generate a test value whenever a particular gear is selected. If a test value is generated every time a gear is selected then the test value could be adapted based upon the dynamic performance of the vehicle 100 such as, for example a relationship between gear ratio rate of acceleration and accelerator pedal position (AP).

When the ECO-mode of operation has been selected by the driver operating the ECO-mode selector switch 154, the speed of the engine 105 is limited when it reaches or exceeds the predefined test value ($N_{ECOUL}$) set so as to provide good fuel economy from the engine 105. The means for controlling the engine speed can be any suitable controlling methodology such as, for example but without limitation, varying the amount of fuel provided to the engine 105 during each injection of fuel, the timing of the injecting of fuel, skipping injections of fuel, varying the timing of inlet and exhaust valves of the engine and, in the case of a spark ignited engine, varying the ignition timing or spark duration. That is to say, the engine speed is controlled by techniques commonly used to effect cruise control of a motor vehicle. The method of engine speed control disclosed in U.S. Pat. No. 8,868,312 discloses one example of how engine speed control could be provided.

The object of the speed control is to maintain the engine speed at a speed substantially equal to or less than the predefined test value until the driver effects an upchange so as to encourage the driver to change up. The control of engine speed does not limit the torque that can be produced by the engine 105 it only limits the speed of the engine 105 and hence the speed of the motor vehicle 100 in that particular gear. This is an important aspect of the engine 105 because if the engine 105 were to be governed by controlling or limiting the torque output of the engine 105 then variations in the terrain over which the vehicle is travelling (e.g., hills) would result in variations in engine speed as would variations in the weight of the motor vehicle 100 or drag effects due to airflow over the motor vehicle 100. By using engine speed as the determining factor all of these effects are eliminated and the engine 105 is operated at increased fuel efficiency irrespective of the above referred to factors.

It will be appreciated that because for a specific gear there is a defined relationship between engine speed and road speed, the method implemented by the control system could alternatively be applied by comparing road speed to a predefined road speed limit and maintaining a constant road speed when an upshift is required. Therefore the terms 'engine speed' and 'road speed' are transposable so far as this description is concerned and the term 'predefined upper engine speed limit' could be replaced by the term 'predefined upper road speed limit'.

As previously described, it may be preferable if the imposing of the speed limiting is a two stage process whereby the upshift indicator light 103U is illuminated at a slightly lower engine speed than the commencement of engine speed limiting so as to forewarn the driver that they need to effect an upshift before the intrusive speed limiting commences. A driver will soon learn that when the upshift indicator light 103U illuminates they are best to change up to avoid an interruption to their progress.

As soon as an upshift has been completed the upshift indicator light 103U will go out and speed limiting will be removed because the engine speed in the new higher gear will be well below the predefined test value set for that gear ratio.

As previously mentioned it may be desirable to allow the speed limiting to be overcome or 'pushed through' by the driver in certain circumstances such as, for example, executing an overtaking maneuver. Therefore, if the accelerator pedal 120 is depressed further than a predefined amount, the speed limiting will not be enabled and the engine 105 is permitted to accelerate up to its desired (e.g., maximum permitted or other speed requested by the driver) rotational speed.

A driver using a motor vehicle using the method described herein will notice when the motor vehicle is accelerating that the acceleration of the motor vehicle will cease when the GSI indicates that an upshift is suggested in order to increase (e.g., optimize) the fuel economy of the motor vehicle. The driver is therefore encouraged to shift into a higher gear e.g., $1^{st}$ to $2^{nd}$; $2^{nd}$ to $3^{rd}$; $3^{rd}$ to $4^{th}$; $4^{th}$ to $5^{th}$ etc. The use of improved upshifting will reduce the amount of fuel used by the engine because the engine is not running so often at a speed where fuel economy is diminished.

Therefore, in summary, as fuel economy becomes ever more important to customers, particularly in real driving conditions, the use of Eco-Modes will dramatically increase and customers will come to expect increased benefit from their use. The solution proposed by this invention of automatically applying a different vehicle/engine speed limit appropriate to the selected gear, particularly when an Eco-mode is active, forcefully encourages the driver to shift-up at the desired speed, for best efficiency, by preventing the vehicle being accelerated past the recommended up-shift point until the next gear is selected is an effective way to achieve improved fuel economy.

One advantage of using engine speed limiting compared to engine torque limitation is that repeatability is maintained for customer transparency. This is especially important for driving on gradients, increased road load (passengers, items in boot, windows open, A/C usage etc.) and towing which require increased torque to maintain the same speed.

Although it is envisaged that in most cases the driver will be given the opportunity to choose whether or not to use an ECO-mode it will be appreciated that the fuel economizing method could be applied with good effect on a motor vehicle having no ECO-mode such that speed limiting is always active when the predefined engine speed limit has been reached.

Although the vehicle system has been described by way of example with respect to providing an audible indication that an upshift is required by means of a buzzer or providing a visual indication that an upshift is required by means of a upshift indicator light it will be appreciated that it is not limited to such means of alerting the driver and that any suitable means for providing such an alert could be used.

The engine 105 shown in FIG. 2 also includes at least one cylinder 160, a fuel injector 162 included in a fuel delivery system that may further includes one or more fuel pumps, valves, fuel tanks, etc. The fuel injector 162 is depicted as a direct injector. Additionally or alternatively, a port fuel injector may be included in the fuel delivery system of the engine 105. Additionally, the engine 105 includes an intake system 164 having a throttle 166. The intake system 164 is configured to provide intake air to the cylinder 160. It will be appreciated that the fuel injector 162 and/or throttle 166 may receive control signals from the control system 150.

Figure 3:
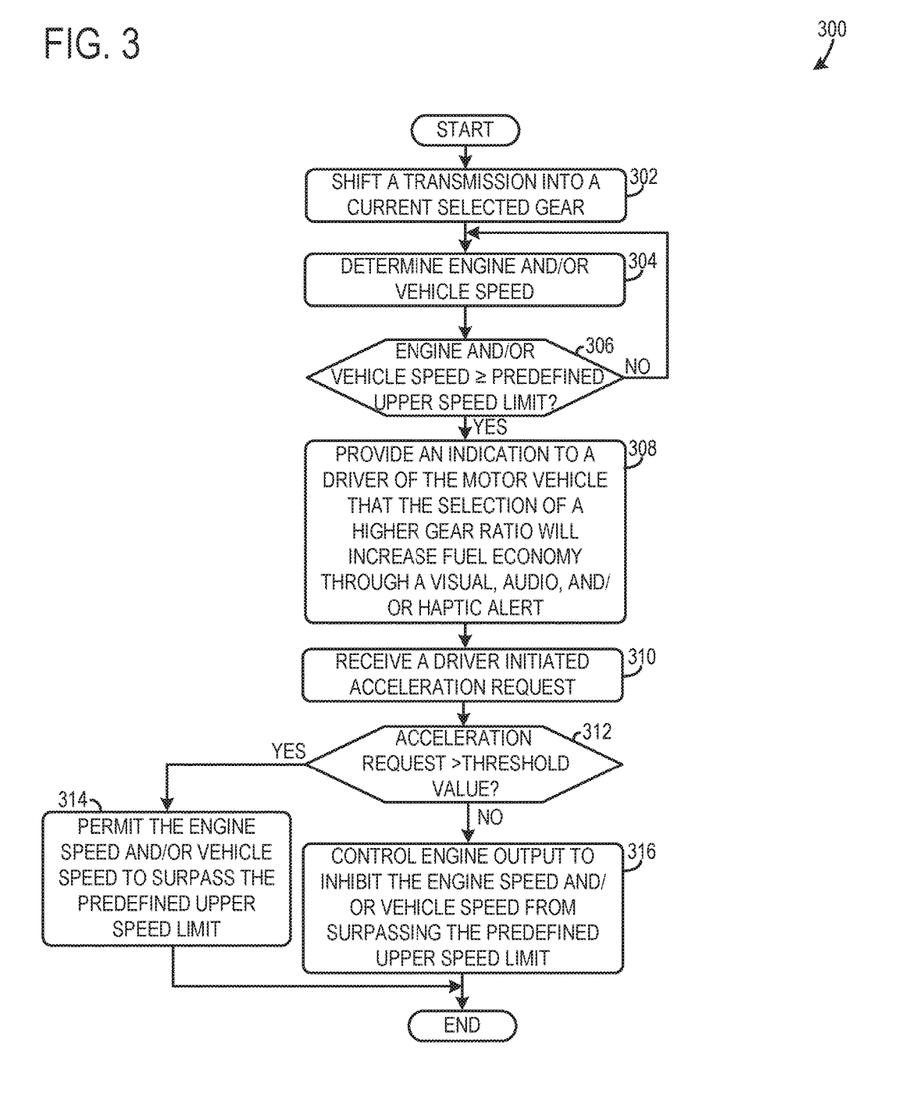
FIG. 3 shows a method for operation of a motor vehicle.

FIG. 3 shows a method 300 for operation of a motor vehicle. The motor vehicle described above with regard to FIG. 2 may be used to implement method 300 or another suitable motor vehicle may be used to implement the method 300, in other examples.

At 302 the method includes shifting a transmission into a current selected gear. The transmission may be a manual transmission, in one example. The manual transmission may include a user operated gear selection device (e.g., gear lever) and a manually controlled clutch. However, in other examples the transmission may be a manumatic transmission.

At 304 the method includes determining engine and/or vehicle speed. The engine and/or vehicle speed may be determined via speed sensors in the vehicle. For instance, an engine speed sensor may be configured to sense the speed of a crankshaft and a vehicle speed sensor may be configured to sense the speed of a vehicle wheel.

At 306 the method determines if the engine and/or vehicle speed has reached a predefined upper speed limit. In one example, the predefined upper speed limit may be associated with an economy mode of operation. As previously discussed, the economy mode of operation may be selected via a driver.

If it is determined that the engine and/or vehicle speed has not reached the predefined upper speed limit (NO at 306) the method returns to 306. However, if it is determined that the engine speed and/or vehicle speed has reached the predefined upper speed limit (YES at 306) the method advances to 308.

At 308 the method includes providing an indication to a driver of the motor vehicle that the selection of a higher gear ratio will increase fuel economy through a visual, audio, and/or haptic alert.

Next at 310 the method includes receiving a driver initiated acceleration request. At 312 the method determines if the driver initiated acceleration request is greater than a threshold value. The threshold value may correspond to an accelerator pedal position, in one example.

If it is determined that the driver initiated acceleration request is greater than the threshold value (YES at 312) the method proceeds to 314. At 314 the method includes permitting the engine speed and/or vehicle speed to surpass the predefined upper speed limit.

However, if it is determined that the driver initiated acceleration request is not greater than the threshold value (NO at 314) the method advances to 316. At 316 the method includes controlling engine output to inhibit the engine speed and/or vehicle speed from surpassing the predefined upper speed limit. In one example, the steps of controlling engine output and providing the indication are implemented at overlapping time intervals. In this way, different cues can be provided to a driver at the same time to increase the likelihood of the driver shifting into a gear that will improve fuel economy. In another example, controlling the engine output includes adjusting a throttle and/or adjusting a fuel delivery system.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for reducing an amount of fuel used by an engine of a motor vehicle having a transmission providing a distinct number of forward ratios selectable by a driver of the motor vehicle, comprising:
   when one of a speed of the engine and a road speed of the vehicle reaches a predefined upper speed limit for a currently selected gear, controlling one of the speed of the engine and the road speed of the vehicle to maintain the speed of the engine or the road speed of the vehicle at a speed substantially equal to the predefined upper speed limit for the currently selected gear; and
   providing an indication to the driver of the motor vehicle that a selection of a higher gear ratio included in the distinct number of forward ratios will increase fuel economy through a visual, audio, and/or haptic alert.

2. The method of claim 1, wherein the predefined upper speed limit is an upper engine speed limit.

3. The method of claim 2, further comprising permitting the speed of the engine to exceed the predefined upper speed limit if an accelerator pedal of the motor vehicle has been depressed from a rest position more than a predefined amount.

4. The method of claim 3, wherein a position of the accelerator pedal is compared with a predefined accelerator pedal position limit to determine whether it has been depressed more than the predefined amount.

5. The method of claim 2, further comprising limiting the engine speed to the predefined upper speed limit if the motor vehicle is operating in an economy mode of operation.

6. The method of claim 2, wherein the method further comprises only providing an indication to the driver of the motor vehicle that the selection of the higher gear ratio will increase fuel economy if the motor vehicle is operating in an economy mode of operation.

7. The method of claim 6, wherein the economy mode of operation is selectable by the driver of the motor vehicle by the use of a human machine interface, the human machine interface including one or more of a manually operable switch, a pseudo switch provided via a touch screen device, a cluster menu system and a voice activated switch.

8. The method of claim 1, wherein the predefined upper speed limit is an upper road speed limit and the method comprises, when the road speed of the motor vehicle reaches a predefined upper road speed limit for the currently selected gear, controlling the road speed of the vehicle to maintain the road speed of the vehicle at a speed substantially equal to the predefined upper road speed limit for the currently selected gear and providing an indication to the driver of the motor vehicle that the selection of the higher gear ratio will increase fuel economy.

9. The method of claim 1, wherein providing an indication to the driver of the motor vehicle that the selection of the higher gear ratio will increase fuel economy comprises at least one of providing an audible indication that an upshift is desired and providing a visual indication that an upshift is desired.

10. A motor vehicle comprising:
   an engine drivingly connected to a transmission having a number of forward ratios selectable by a driver of the motor vehicle; and
   a control system controlling operation of the engine and including a controller configured to:
      when a rotational speed of the engine reaches a predefined upper engine speed limit for a currently selected gear, control the rotational speed of the engine to maintain the rotational speed of the engine at a value substantially equal to the predefined upper engine speed limit for the currently selected gear; and
      provide an indication to the driver of the motor vehicle that a selection of a higher gear ratio will increase fuel economy;
      wherein the control system only controls the rotational speed of the engine to the predefined upper engine speed limit if the motor vehicle is operating in an ECO-mode of operation.

11. The motor vehicle of claim 10, wherein the motor vehicle further comprises an accelerator pedal to provide an input of driver demand and the control system is further configured to permit the rotational speed of the engine to exceed the predefined upper engine speed limit if the accelerator pedal has been depressed from a rest position more than a predefined amount.

12. The motor vehicle of claim 11, wherein the control system is operable to compare a position of the accelerator pedal with a predefined accelerator pedal position limit to determine whether the accelerator pedal has been depressed more than the predefined amount.

13. The motor vehicle of claim 10, wherein the control system only provides an indication to the driver of the motor vehicle that the selection of the higher gear ratio will increase fuel economy if the motor vehicle is operating in the ECO-mode of operation.

14. The motor vehicle of claim 13, wherein the motor vehicle further comprises a human machine interface and the ECO-mode of operation is selectable by the driver of the motor vehicle by the use of the human machine interface, the human machine interface including one or more of a manually operable switch, a pseudo switch provided via a touch screen device, a cluster menu system and a voice activated switch.

15. The motor vehicle of claim 10, wherein providing an indication to the driver of the motor vehicle that the selection of the higher gear ratio will increase fuel economy comprises at least one of providing an audible indication that an upshift is desired and providing a visual indication that an upshift is desired.

16. The motor vehicle of claim 10, wherein the transmission is a manual transmission having a driver operable gear lever to select a desired gear of the transmission and wherein the engine is drivingly connected to the transmission by a manually controlled clutch.

17. A method for operating a motor vehicle including an engine driving a transmission having a plurality of selectable gears, comprising:

adjusting the transmission into a current selected gear;
determining an engine speed and/or vehicle speed;
when the engine speed and/or vehicle speed reaches a predefined upper speed limit associated with the current selected gear, controlling engine output to inhibit the engine speed and/or vehicle speed from surpassing the predefined upper speed limit; and
providing an indication to a driver of the motor vehicle that a selection of a higher gear ratio will increase fuel economy through a visual, audio, and/or haptic alert;
where the steps of controlling engine output and providing the indication are implemented at overlapping time intervals.

18. The method of claim 17, further comprising, if a driver acceleration request surpasses a threshold acceleration request level, permitting the engine speed and/or vehicle speed to surpass the predefined upper speed limit.

19. The method of claim 18, where the driver acceleration request is generated by an accelerator pedal.

20. The method of claim 17, where controlling the engine output includes adjusting a throttle and/or adjusting a fuel delivery system.

21. The method of claim 17, where the predefined upper speed limit corresponds to an economy mode of vehicle operation.

22. The method of claim 21, where the economy mode is driver selectable.

23. The method of claim 17, where the transmission is a manual transmission.

* * * * *